US005339018A

United States Patent [19]

Brokaw

[11] Patent Number: 5,339,018
[45] Date of Patent: Aug. 16, 1994

[54] INTEGRATED CIRCUIT MONITOR FOR STORAGE BATTERY VOLTAGE AND TEMPERATURE

[75] Inventor: A. Paul Brokaw, Burlington, Mass.

[73] Assignee: Analog Devices, Inc., Norwood, Mass.

[21] Appl. No.: 978,185

[22] Filed: Nov. 17, 1992

Related U.S. Application Data

[63] Continuation of Ser. No. 789,764, Nov. 8, 1991, abandoned, which is a continuation of Ser. No. 373,918, Jun. 30, 1989, abandoned.

[51] Int. Cl.[5] .............................................. H02J 7/04
[52] U.S. Cl. ........................................ 320/35; 320/32; 320/39
[58] Field of Search ............... 320/31, 32, 35, 36, 320/39, 40, 61; 323/281; G05F 1/40, 1/44, 1/56

[56] References Cited

U.S. PATENT DOCUMENTS

| | | | |
|---|---|---|---|
| 3,585,482 | 6/1971 | Zelina | 320/35 X |
| 3,600,661 | 8/1971 | Briggs et al. | 320/35 |
| 3,887,863 | 6/1975 | Brokaw | 323/19 |
| 3,895,283 | 7/1975 | Peterson | 320/36 X |
| 4,065,712 | 12/1977 | Godard et al. | 320/35 X |
| 4,209,736 | 6/1980 | Reidenbach | 320/35 X |
| 4,220,908 | 9/1980 | Nicol | 320/35 X |
| 4,250,445 | 2/1981 | Brokaw | 323/313 |
| 4,308,492 | 12/1981 | Mori et al. | 320/35 X |
| 4,380,725 | 4/1983 | Sherman | 320/35 |
| 4,380,728 | 4/1983 | Kearney | 323/281 |
| 4,386,308 | 5/1983 | Emile, Jr. et al. | 320/22 |
| 4,399,398 | 8/1983 | Wittlinger | 323/314 X |
| 4,554,500 | 11/1985 | Sokira | 320/35 X |
| 4,563,631 | 1/1986 | Mashino et al. | 320/35 X |
| 4,667,143 | 5/1987 | Cooper et al. | 320/35 X |
| 4,939,442 | 3/1989 | Carvajal et al. | 323/281 |
| 4,992,722 | 2/1991 | Maruyama et al. | 320/35 |

FOREIGN PATENT DOCUMENTS

| | | |
|---|---|---|
| 0189885 | 1/1986 | European Pat. Off. . |
| 2572860 | 11/1984 | France . |
| 2562733 | 10/1985 | France .................. 320/35 |
| 2601527 | 6/1986 | France . |

OTHER PUBLICATIONS

Horowitz and Hill, The Art of Electronics, 1980, pp. 192–195.

*Primary Examiner*—Kristine L. Peckman
*Attorney, Agent, or Firm*—Wolf, Greenfield & Sacks

[57] ABSTRACT

An apparatus for monitoring voltage as a function of temperature of a storage battery and an apparatus for controlling the charging voltage of the battery based on battery temperature, voltage, and charging system loads. The battery monitoring apparatus includes a comparator for comparing, at any temperature in the working temperature range of the battery, the actual battery voltage with a reference battery voltage. The reference battery voltage is the voltage gassing curve for the storage battery. The comparator is given a temperature coefficient provided by a temperature-sensitive band-gap voltage reference. A plurality of the temperature-sensitive band-gap reference cells may be connected together in order to accurately track any differently sloped battery gassing voltage curve. An apparatus for controlling charging voltage of the storage battery is also provided, which includes a comparator for comparing, at any temperature in a predetermined range, the actual charging voltage with a reference charging voltage. The reference charging voltage curve is a function of charging system component temperatures and electrical system loads. A plurality of comparators may be connected together in order to approximate any desired charging voltage reference curve or combination of curves.

35 Claims, 6 Drawing Sheets

INTEGRATED CIRCUIT MONITOR FOR STORAGE BATTERY VOLTAGE AND TEMPERATURE

This application is a continuation of application Ser. No. 07/789,764, filed Nov. 8, 1991 now abandoned, which is a continuation of application Ser. No. 07/373,918, filed Jun. 30, 1989, now abandoned.

BACKGROUND OF THE INVENTION

1. Field of the Invention

The present invention relates generally to the field of charging control circuitry that acts to effect charging of a storage battery in response to the actual battery voltage and battery temperature. The present invention also relates to voltage monitoring circuits and more particularly to circuits that monitor voltage as a function of temperature.

2. Discussion of the Prior Art

Storage batteries, such as those used in automobile electrical systems, must be recharged after use to restore the full electrical capacity of the battery. While it is desirable to charge the storage battery fully, it is possible to damage the battery by over-charging it. An automobile battery charging system therefore must monitor the battery voltage and charge the battery when the voltage is low, but limit charging as the battery voltage approaches a predetermined limit. This predetermined limit is defined by the gassing voltage, that is, the voltage at which the electrolyte is dissociated and evolves hydrogen and oxygen. The state of charge of a storage battery is maximized as the battery voltage approaches the gassing voltage. The gassing voltage depends upon the temperature of the battery and is inversely proportional to battery temperature. A "cold" battery will have a high gassing voltage, while a "warm" battery will have a lower gassing voltage. For example, FIG. 1 shows the gassing voltage versus temperature of a typical 12 volt automobile storage battery. When the battery voltage is higher than the gassing voltage for a particular temperature, the battery electrolyte will begin to dissociate. Since the state of charge of the battery is maximized just below the gassing voltage, as shown in FIG. 1, a "cold" battery charged only to the "warm" battery gassing voltage would be severely below capacity. Therefore, in order to maintain the battery in the highest state of charge, the battery voltage should track the gassing voltage curve.

One prior art charging system has a temperature-sensitive characteristic which limits the battery charging voltage as a function of the temperature of the voltage regulator. However, the voltage regulator is often physically separated from the battery and is therefore frequently at a different temperature than the battery. For example, if the voltage regulator is mounted on or in the alternator, it senses the alternator temperature which is generally higher than the storage battery temperature. In addition, when the alternator is heavily loaded by various electrical accessories within an automobile, the alternator may experience a significant temperature rise. The elevated temperature will cause the voltage regulator to limit the battery charging voltage and thereby cause the battery to be undercharged. This effect may be exaggerated in cold weather where the demands on the battery for starting the engine and operation of vehicle electrical accessories are very high. The high load on the voltage regulator and alternator may increase the temperature of the voltage regulator and thus exaggerate the temperature differential between the "cold" battery and the "hot" voltage regulator. The result is that the battery is severely undercharged during cold weather, which is just the time when the battery should be in its highest state of charge due to the high electrical loads on the vehicle electrical system.

Another prior art method for measuring battery temperature is through the use of a temperature-sensitive resistor placed in close proximity to the battery. However, this resistor would be measured by the alternator or voltage regulator and therefore requires additional special wiring in order to insure an accurate measurement.

It is therefore an object of the present invention to provide a temperature-sensitive voltage monitoring apparatus which may be used to determine when a storage battery should be charged at the measured combination of battery voltage and battery temperature.

Another object of the present invention is to provide a charging system control apparatus that maintains a storage battery in its highest state of charge for a given battery temperature.

Yet another object of the present invention is to provide a charging control system apparatus that limits charging system voltage as a function of the voltage regulator or the alternator temperature.

Still another object of the present invention is to provide a charging system control apparatus that regulates the charging system voltage as a function of electrical accessory use.

Another object of the present invention is to provide a temperature sensitive voltage monitoring apparatus that may be fabricated using integrated circuit technology.

A still further object of the present invention is to provide an alternator control apparatus that may be fabricated using integrated circuit technology.

SUMMARY OF THE INVENTION

The present invention achieves the foregoing objects and features in a battery monitor apparatus which includes a comparator for comparing, at any temperature in a predetermined range in the working temperature range of the battery, the actual battery voltage with an internal reference voltage that corresponds to the battery voltage gassing curve. The battery monitor apparatus additionally includes an output unit for providing a signal responsive to the comparator indicating that the battery should be charged when the actual battery voltage, for a predetermined temperature, is less than the internal reference voltage. The comparator includes a band-gap reference voltage cell which has a temperature coefficient that may be adjusted in order to track a particular battery gassing voltage curve. The band-gap cell may have a positive or negative temperature coefficient and may follow linear, as well as non-linear reference voltage curves. Additional comparators may be logically connected together in order to allow the apparatus to more closely approximate a particular battery gassing voltage curve.

The present invention additionally includes an alternator control apparatus which includes a comparator for comparing, at any temperature in a predetermined range, the actual charging voltage with an internal reference voltage that corresponds to a desired charging voltage curve. The alternator control apparatus indicates, for a predetermined temperature, when the actual charging voltage is greater than or less than the internal reference voltage. The alternator control apparatus includes a band-gap reference voltage cell whose temperature coefficient may be adjusted in order to track any desired charging voltage control curve. Additional comparators are provided in the alternator control apparatus in order to prevent excessive charging voltages depending upon the electrical load on the charging system. Other comparators are provided in the alternator control apparatus to protect temperature sensitive charging system components from excessive temperatures by providing temperature sensitive control thresholds. The alternator control apparatus is additionally responsive to the battery monitor apparatus and maintains the battery in the highest state of charge for a given temperature and electrical system load. The alternator control apparatus can track any voltage curves, including linear and non-linear curves as well as curves with positive or negative temperature coefficients. In addition, the alternator control apparatus can track more than one reference voltage curve.

The apparatus of the present invention may be fabricated using integrated circuit technology. In addition, the circuitry may be separated into two separate integrated circuits, the first including the temperature/voltage monitoring function and the second including the battery charging control circuitry. To obtain accurate monitoring of the battery temperature, the temperature/voltage measurement circuit is mounted in close proximity to, or in intimate contact with, the vehicle battery. To obtain a close coupling to the alternator to be controlled as well as an accurate measurement of the alternator temperature, the charging control circuitry is mounted in close proximity to, or in intimate contact with, the vehicle alternator.

The foregoing and other objects, features, and advantages of the present invention will be more readily understood and apparent from the following detailed description of the invention, which should be read in conjunction with the accompanying drawing, and from the claims which are appended at the end of the detailed description.

DETAILED DESCRIPTION

For purposes of illustration only, and not to limit generality, the present invention will now be explained with reference to its use in the electrical system of an automobile. However, one skilled in the art will appreciate that the features and functions of the invention are useful in applications outside of automobile electrical systems.

Figure 1:
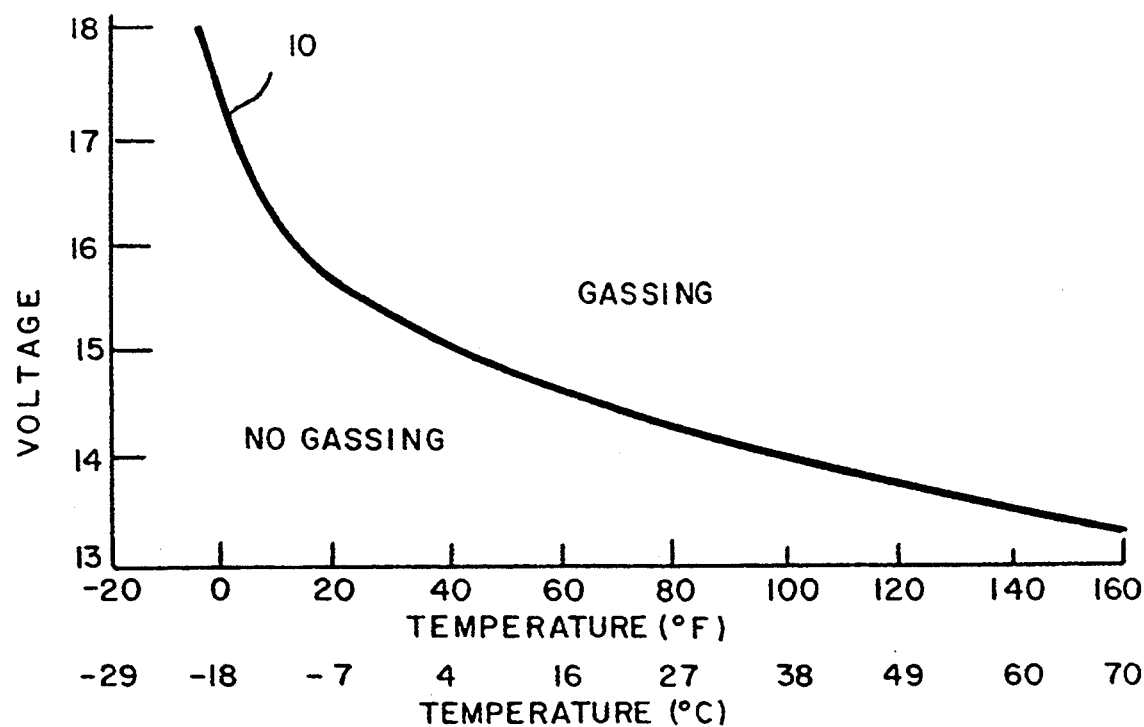
FIG. 1 is a graph depicting a temperature-sensitive voltage limit for lead-acid batteries of nominally twelve volts, and indicating the gassing limit.

FIG. 1 shows a typical gassing voltage curve 10 for a 12-volt automobile battery. The gassing voltage is the point at which the electrolyte becomes disassociated and evolves hydrogen and oxygen, thus damaging the battery. As shown in FIG. 1, for a given temperature, if the battery voltage is raised above the characteristic curve 10, then gassing will occur. The gassing voltage varies inversely with the battery temperature. In order to maintain the vehicle battery in its highest state of charge, the vehicle charging system should follow the gassing curve, because the state of charge of the battery is maximized just below the gassing voltage, for a given battery temperature.

Figure 2:
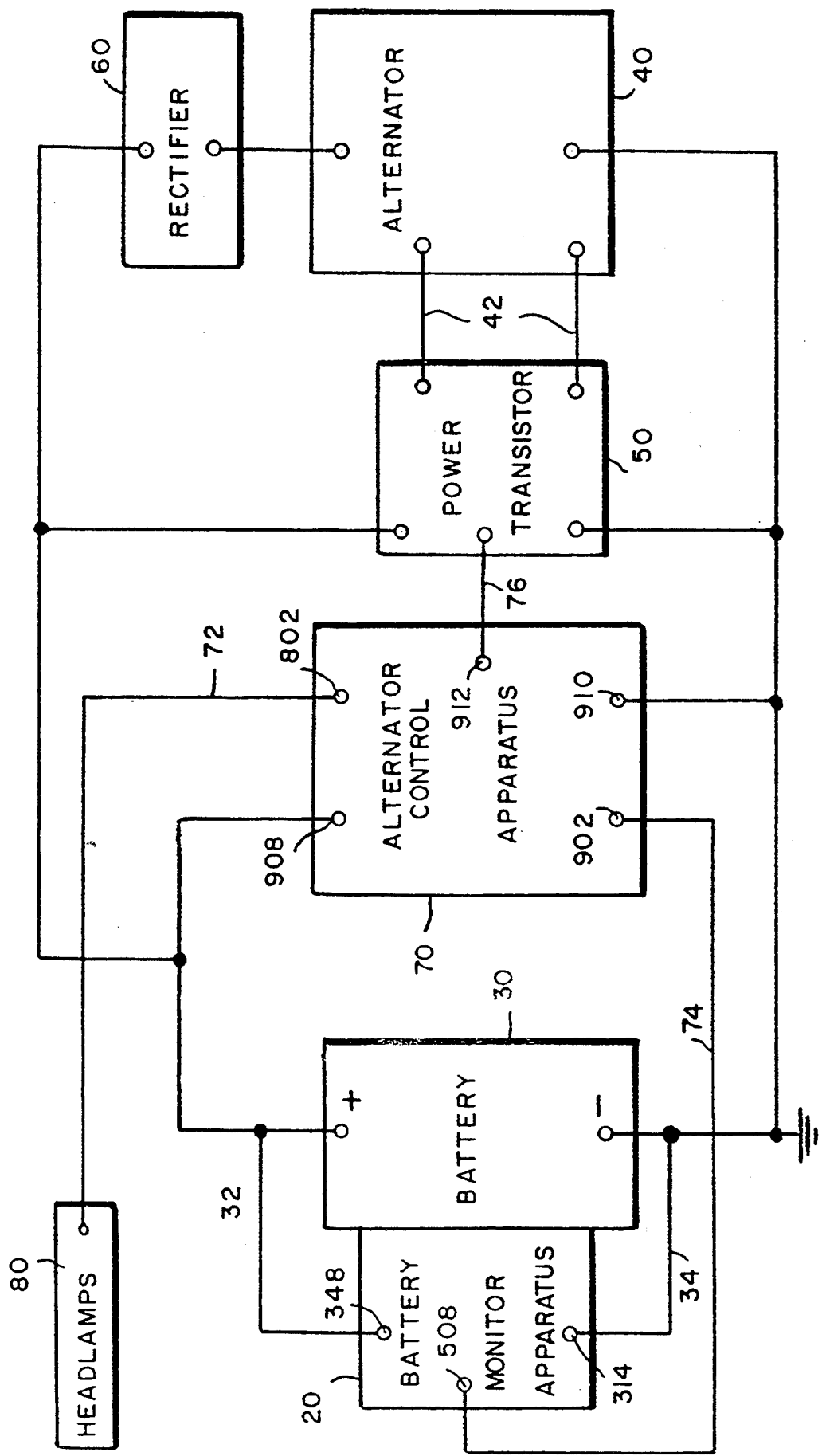
FIG. 2 is a schematic block diagram of the present invention showing the interconnection between the temperature/voltage monitoring apparatus and the charging system control apparatus in an automobile charging system.

FIG. 2 shows an automobile charging system employing the apparatus of the present invention. Battery monitor apparatus 20 is placed in intimate physical contact with the battery 30 so that the battery and the battery monitor apparatus will be at the same temperature. The battery monitor apparatus is connected to the battery terminals via connections 32 and 34. The charging system further includes an alternator 40 which requires excitation current to be supplied through the winding connections 42 by the power transistor 50 when the alternator 40 is to generate current. Rectifier 60 is provided to change the alternating current from the alternator 40 to direct current. Excitation current for the alternator is controlled by alternator control apparatus 70 as a function of the battery voltage and temperature measured by the battery monitor apparatus 20, and whether or not the headlamps 80 are on, as indicated by a signal on line 72. The alternator control apparatus is placed in intimate physical contact with the power transistor 5, the alternator 3, or the rectifier 6, depending upon which device has the most critical temperature characteristic. If the charging system uses a combination device, such as an alternator and rectifier contained within the same housing, then the alternator control apparatus would be placed in intimate physical contact with the combination device. The alternator control apparatus and the device which has the most temperature-critical characteristic will therefore be at the same temperature. The battery monitor apparatus signals the alternator control apparatus via signal line 74 to charge the battery.

During operation, as will be explained in greater detail hereinafter, the battery monitor apparatus 20 outputs a control signal on signal line 74 as a function of actual battery voltage at a particular temperature indicating whether or not the battery should be charged. The battery monitor apparatus determines whether or not the battery should be charged by comparing the actual battery voltage/temperature with an internal reference voltage that corresponds to the curve of FIG. 3. The battery monitor apparatus determines that the battery should be charged when the actual battery voltage is less than the internal reference voltage. The battery monitor apparatus signals the alternator control apparatus 70 via signal line 74 to supply excitation current to the alternator. The alternator control apparatus supplies excitation current to the alternator via signal line 76, power transistor 50, and alternator winding connections 42. The alternator control apparatus signals the alternator to supply charging current to the battery when a comparison of the actual charging system voltage with an internal reference voltage that corresponds to the curves shown in FIG. 4 indicates that the actual charging system voltage is less than the internal reference voltage.

Figure 3:
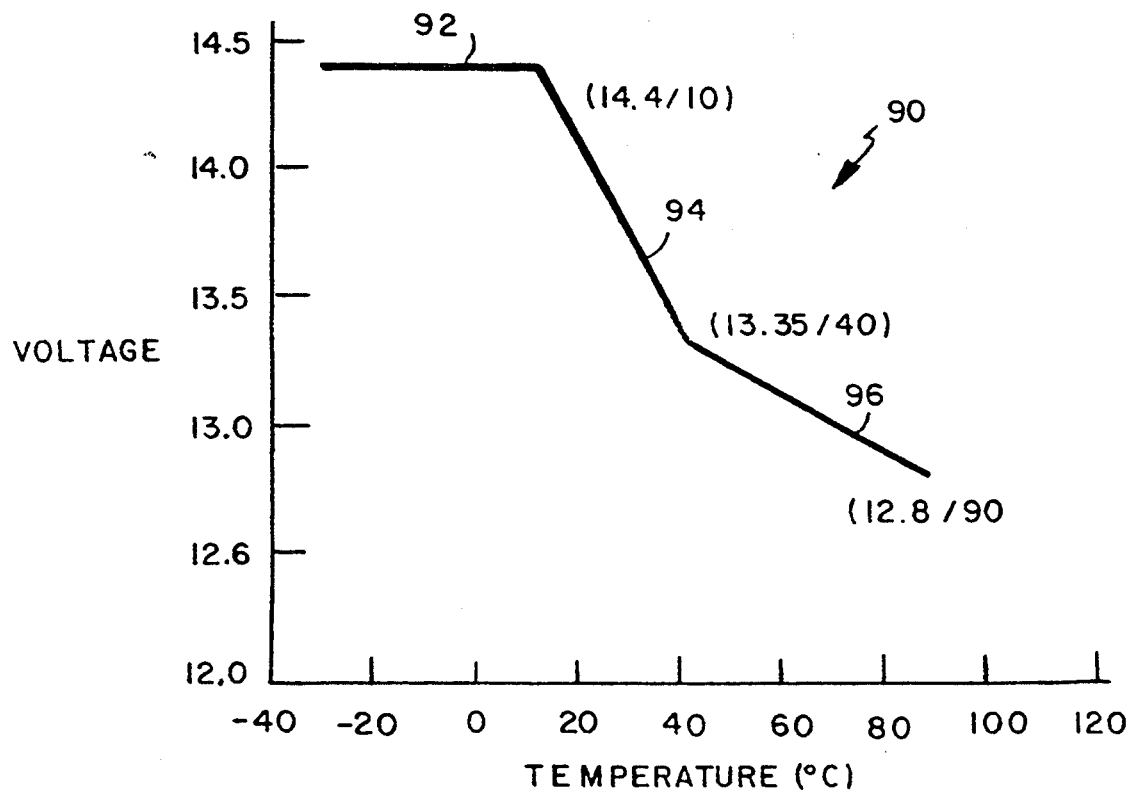
FIG. 3 is a graph depicting a desired relationship between storage battery temperature and battery voltage in the system of FIG. 2.

FIG. 3 is a graph depicting a desired control limit for the battery voltage gassing curve 10 shown in FIG. 1. The battery gassing control curve 90 in FIG. 3 includes three separate sections, 92, 94, and 96. Below approximately 10° Celsius, as shown by section 92 of the curve in FIG. 3, the charging system should charge the battery to 14.4 volts in order to maintain the battery in the highest state of charge which can safely be applied to the electrical system. Between 10° Celsius and 40° Celsius, as shown in section 94 of the curve in FIG. 3, the battery should be charged to a voltage of 14.4 volts minus 35 millivolts for every degree increase in the Celsius temperature of the battery above 10° Celsius. Between 40° Celsius and 90° Celsius, as shown by section 96 of the curve in FIG. 3, the battery should be charged to a voltage of 13.35 volts minus 11 millivolts for every degree increase in the Celsius temperature of the battery above 40°. The curve of FIG. 3 applies over the working temperature range of the battery from −40° Celsius to +90° Celsius. Temperatures outside this range are considered to be outside the working capability of the battery.

Figure 5:
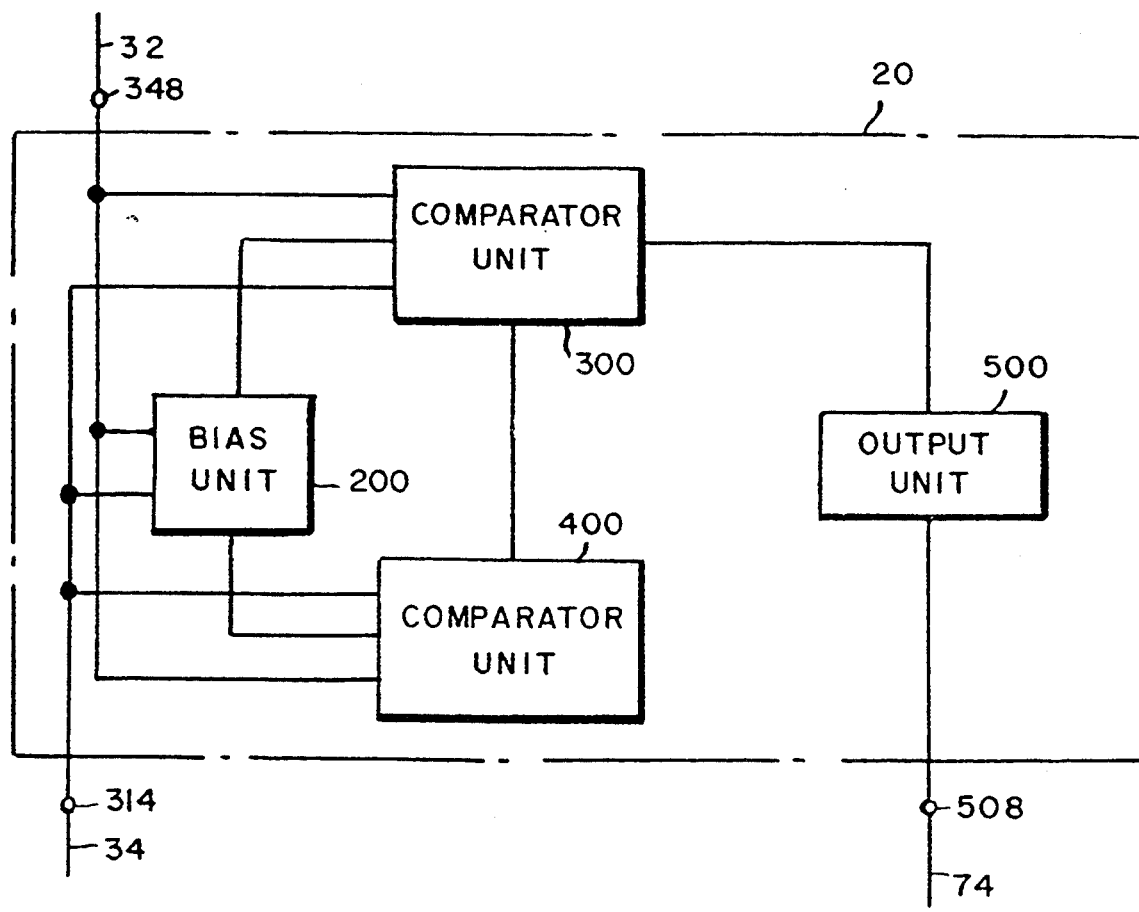
FIG. 5 is a schematic block diagram of an apparatus which may be used to track the storage battery temperature/voltage curve shown in FIG. 3.

The battery voltage reference curve, as shown in FIG. 3, may be tracked using an apparatus such as battery monitor apparatus 20 as shown in FIG. 5. The battery monitor apparatus is designed to provide a temperature-varying voltage threshold indicating when the battery should be charged. It performs this function by comparing the actual battery voltage/temperature with an internal reference voltage that corresponds to sections 94 and 96 of the curve of FIG. 3. If the actual voltage and temperature of the battery are below the internal reference voltage that corresponds to the curve of FIG. 3, the battery monitor apparatus 20 will emit a signal on signal line 74 indicating that charging of the battery is permitted. If the actual voltage and temperature of the battery are above the internal reference voltage that corresponds to the curve of FIG. 3, the battery monitor apparatus 20 will emit a signal on signal line 74 indicating that the battery should not be charged. The battery monitor apparatus 20, as shown in FIG. 5, includes bias unit 200, comparator units 300 and 400, and output unit 500. The units are interconnected, as will be explained in greater detail hereinafter. Comparator unit 300 has a temperature coefficient whose slope corresponds to the slope of section 94 of the curve shown in FIG. 3 and comparator unit 400 has a temperature coefficient whose slope corresponds to the slope of section 96 of the curve shown in FIG. 3. Therefore, comparator unit 300 will exclusively control battery charging for temperatures between 10° Celsius and 40° Celsius. Comparator unit 400 will exclusively control battery charging for temperatures between 40° Celsius and 90°.

Figure 6:
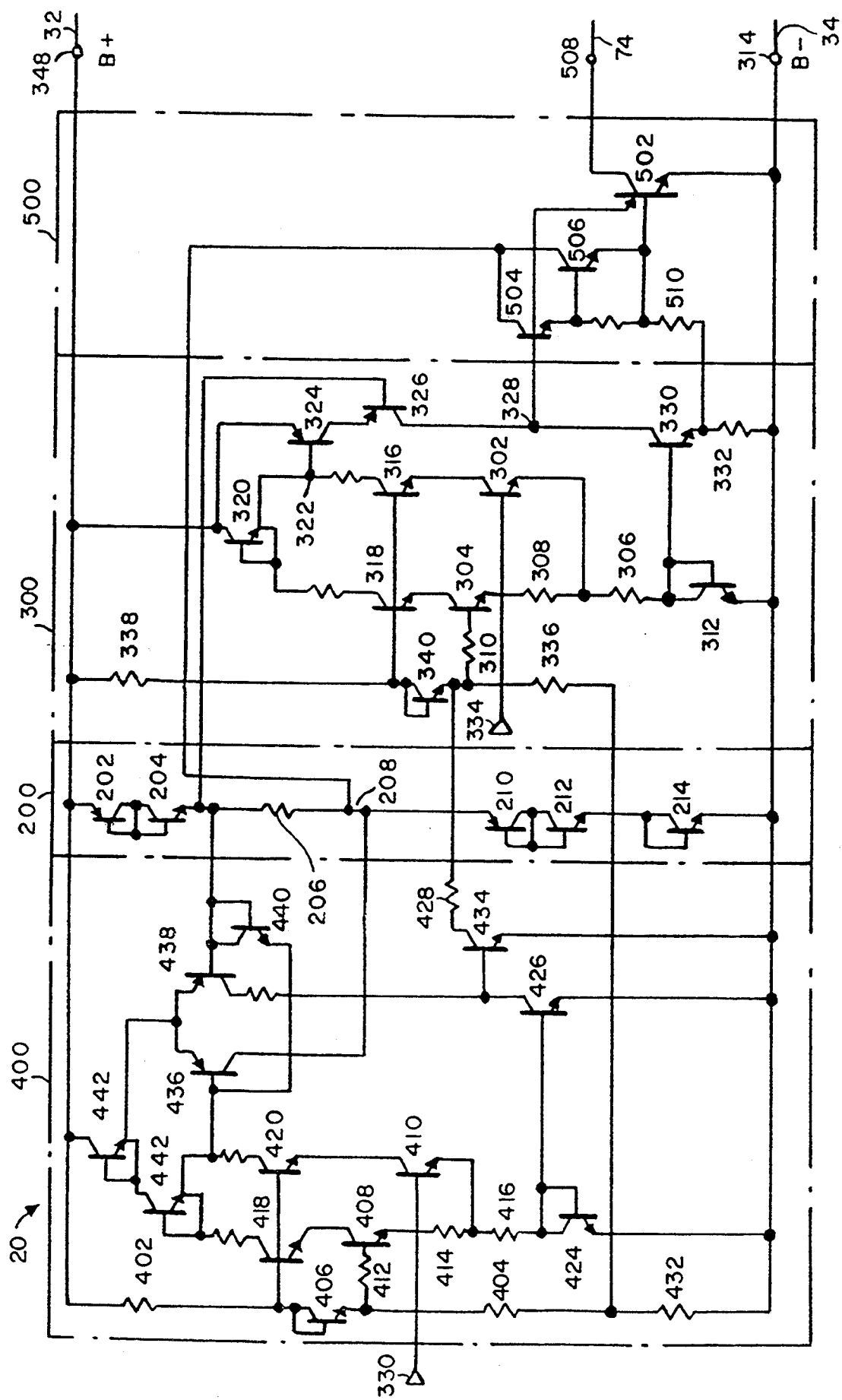
FIG. 6 is an illustrative schematic diagram of a circuit of the present invention for monitoring voltage as a function of temperature.

The function of the battery monitor apparatus, as shown in FIG. 5, is to output a signal as a function of the battery temperature and battery voltage which indicates that the battery requires charging. An illustrative circuit for such a battery monitor apparatus is shown in FIG. 6.

Referring to the latter figures, the circuitry used to implement the comparator unit 300 will now be described. Transistors 302 and 304 together with resistors 306, 308, and 310 make up a basic band-gap cell, as disclosed in U.S. Pat. No. 3,887,863, entitled Solid State Regulated Voltage Supply, and assigned to the same assignee as the present invention. The specification of U.S. Pat. No. 3,887,863 is incorporated herein by reference. Transistor 312 is diode-connected and adds a second base-emitter voltage to the voltages appearing between the base of transistor 302 and the B- or common node 314. It is a well known characteristic of transistors that the base-emitter voltage, $V_{BE}$, has a negative temperature coefficient. Therefore, as resistor 306 is made larger, if the voltage across that resistor has a positive temperature coefficient, its temperature coefficient will compensate for the negative temperature coefficient of transistor 312 with a voltage that is proportional to absolute temperature. The overall effect is to double the voltage at which the band-gap cell achieves equilibrium. The point at which equilibrium is attained by the band-gap cell will be affected by any variations in the collector voltages of transistors 302 and 304. Therefore, transistors 316 and 318 are connected in cascade with transistors 302 and 304, respectively, in order to minimize collector voltage variations. The collector currents of transistors 302 and 304 are sent through transistors 316 and 318 respectively, to a controlled-beta transistor 320, which acts as an active load for transistors 302 and 304.

The output of the band-gap cell is carried via connection 322 to the base of transistor 324, which acts as a voltage amplifier and signals when the band-gap cell passes through its equilibrium point. On one side of the equilibrium point, the circuit will indicate that the battery requires charging, while on the other side of the equilibrium point, the circuit will indicate that the battery should not be charged. In order to minimize the effects of collector voltage variation on transistor 324, transistor 326 is connected in cascode fashion with transistor 324.

To accurately maintain the switching threshold, the collector current in transistor 324 is balanced at node 328 by current from transistor 330. At the switching threshold, the current in transistor 330 is set equal to the current in diode-connected transistor 312. The current in transistor 312 is the current through the band-gap cell, which approximates the active load current in transistor 320. Consequently, the current through transistor 324 must at least equal the current through transistor 312 in order to turn on the output transistor 502. Consequently, at the equilibrium point, the base current of transistor 324 should equal the base current of transistor 320. Equalizing the base currents between transistors 324 and 320 cancels the errors introduced into the circuit by the base currents, so that errors over the entire circuit are minimized.

The combination of transistor 312, transistor 330 and resistor 332 forms a current mirror. Transistor 330 is sized to compensate for the voltage drop through resistor 332 at equilibrium. The collector currents of transistors 312 and 330 are thus made equal. Resistor 332 raises the output resistance of transistor 330, and provides positive feedback for output section 500.

Turning to the output unit 500, transistor 326 drives the base of transistor 504. Transistors 504 and 506 are Darlington-connected and drive the base of the output transistor 502. For this exemplary circuit configuration, when the band-gap cell voltage is below the equilibrium voltage, transistor 324 will be switched off and, therefore, the output transistor 502 will be switched off. As the band-gap cell voltage rises above the equilibrium point, transistor 324 will be switched on, switching on output transistor 502 via transistors 504 and 506. In this particular circuit, when transistor 502 is in the "on" state, the output signal at node 508 will indicate that the battery should not be charged, while the output signal at node 508 when transistor 502 in the "off" state will indicate that the battery may be charged. When the band-gap cell voltage rises towards the equilibrium voltage, the base of output transistor 502 begins to be driven on. Current will flow through resistor 510, to resistor 332 and to the emitter of transistor 330. The emitter voltage of transistor 330 rises, which allows the base of transistor 504 to be driven more positive. This in turn results in a more positive voltage at the base of output transistor 502 and, consequently, more current through resistor 510. The regenerative effect just described causes the circuit to switch abruptly from the "off" state to the "on" state when the lower threshold of the equilibrium voltage is reached.

Such a positive feedback loop will produce a small hysteresis around the switching threshold. Consequently, as the band-gap cell voltage falls below the original voltage triggering threshold, the collector current delivered by voltage amplifier transistor 324 must decrease below the original triggering level in order to reduce the base voltage of transistor 504 enough to turn it off. However, as transistor 504 begins to turn off, the base voltage of output transistor 502 decreases, thus decreasing the amount of current flowing through resistor 510. As the current through resistor 510 decreases, the voltage on the emitter of transistor 330 will decrease as well and, therefore, the collector current of transistor 330 will increase. Consequently, the circuit will switch abruptly to its off state at output transistor 502.

Hysteresis in all the switching points is desirable to prevent states other than the on/off states of the output transistor 502. On and off states are relatively low power dissipation states, while intermediate states are high power dissipation conditions.

Next, the circuitry used to perform the function of biasing unit 200 will be described. Biasing current for comparators 300 and 400 is provided by diode-connected transistors 202 and 204 in series with resistor 206. The voltage at node 208 of the biasing circuit is limited by the diode-connected transistors 210, 212, and 214.

Next, the manner is which the circuit tracks the battery gassing voltage curve of FIG. 3 will be described. The signal provided at the output of output transistor 502 (i.e., node 508) must be a function of battery temperature, in order to indicate whether the battery should be charged or not. This is accomplished by making the temperature coefficient of comparator 300 correspond to the battery gassing voltage curve portion 94 shown in FIG. 3 and by making the temperature coefficient of comparator 400 correspond to the battery gassing voltage curve portion 96 shown in FIG. 3. Giving comparator 300 the required temperature coefficient is accomplished by adjusting the temperature coefficient of the band-gap cell, selecting the value of resistor 306 so that the voltage across it does not compensate for the temperature coefficient of the $V_{BE}$ voltage of transistors 312 and 302. If the resistance of resistor 306 is chosen so that the voltage across resistor 306 is smaller than the required compensating voltage, the circuit will have a negative temperature coefficient. If, on the other hand, the resistance of resistor 306 is made larger and the voltage drop across resistor 306 exceeds the necessary compensating voltage, the circuit will have a positive temperature coefficient.

The voltage divider composed of resistors 336, 338, and diode-connected transistor 340 is used to ratiometrically relate the band-gap cell input voltage to the battery or B+ voltage. Diode-connected transistor 340 keeps the voltage at the base of cascode-connected transistors 318 and 316 one $V_{BE}$ voltage level above the bases of the transistors 304 and 302, respectively, in order to maintain the cascode effect. However, diode-connected transistor 340 introduces a temperature dependency into the voltage at node 334. The temperature dependency of the voltage divider output at node 334 must be compensated for if the temperature coefficient of the band-gap cell is to closely correspond to the battery gassing voltage curve.

The equilibrium point $V_B$ of a simple band-gap cell is given by $$V_B = V_{GO} + TC \cdot T \qquad (100)$$

For analytical convenience, the voltage divider including resistors 336 and 338 may be thought of as being offset from the actual voltage across the voltage divider by the voltage across diode-connected transistor 340, including its temperature coefficient. The input to the band-gap cell may be thought of as simply the voltage at node 348 minus the voltage drop across diode-connected transistor 340 reduced by a simple resistive divider (consisting of resistors 336 and 338). Therefore, the ratio of the temperature coefficient of the equilibrium voltage to the equilibrium voltage must be same as the ratio of the temperature coefficient of the voltage divider output to the voltage divider output voltage or:

$$TC = V_B \left[ \frac{TC(V_{334^*})}{V_{334^*}} \right] \qquad (110)$$

where TC is the temperature coefficient and $V_{334}$ is the voltage divider output of an imaginary voltage divider consisting of resistors 336 and 338, at node 334 when the bandgap cell is at equilibrium.

By simple substitution into equation 100:

$$V_B = \frac{V_{GO}}{1 - \frac{TC(V_{334^*})}{V_{334^*}} \cdot T} \qquad (120)$$

If V is the desired input threshold voltage, then the effective voltage across the imaginary resistive divider formed by resistors 336 and 338 is just the voltage at node 348 reduced by the voltage across diode connected transistor 340. The temperature coefficient of this voltage is:

$$TC_{(V334*)} = \frac{V_{BE}(Q340) - V_{GO}}{T} \quad (130)$$

where $V_{BE}(Q340)$ is the base-emitter voltage of transistor 340.

In order to compensate for this effect, the temperature coefficient of $V_{334}$ (that is, the input voltage to the band-gap cell at node 334) should be just the negative of equation 130, so that:

$$V_B = \frac{V_{GO}}{1 - \frac{V_{GO} - V_{BE}(Q340) + TC(V) \cdot T}{V - V_{BE}(Q340)}} \quad (140)$$

Once $V_B$ has been determined, resistor 308 may be determined from the following equation:

$$R_{308} = \frac{\left(\frac{kT}{q}\right)\ln\left(\frac{j1}{j2}\right)}{i} \quad (150)$$

where j1/j2 is the ratio of the area of the emitters of transistor 302 and transistor 304, i is the operating current for transistor 302, and $R_{308}$ is the value of resistor 308.

The value of resistor 306 may be determined from the following equation:

$$R_{306} = \frac{2V_B(T) - V_{BE}(Q312) - V_{BE}(Q302)}{2i} \quad (160)$$

where $R_{306}$ is the value of resistor 306, $V_{BE}(Q312)$ is the base-emitter voltage of transistor 312, and $V_{BE}(Q302)$ is the base-emitter voltage of transistor 302.

If I is the design temperature current in the imaginary resistor 336, 338 voltage divider, then:

$$R_{336} = \frac{2V_B(T)}{I} \quad (170)$$

where $R_{336}$ is the value of resistor 336 and $$R_{338} = \frac{V - V_{BE}(Q340)}{I} - R_{336} \quad (180)$$

where $R_{338}$ is the value of resistor 338.

Finally, $R_{310}$, the value of the inter-base resistor between transistors 302 and 304, may be determined from the following equation:

$$R_{310} = \left[\frac{2R_{338}R_{336}}{R_{338} + R_{336}}\right] \cdot \left[\frac{R_{308}}{R_{306}}\right] \quad (190)$$

The values of the components of comparator 300 are selected to make the input switching voltage threshold of the band-gap cell correspond to a voltage at node 348 equal to 14.75 volts minus 35 millivolts per degree Celsius. Therefore, this comparator is active for the range corresponding to section 94 of the curve shown in FIG. 3. That is, when the battery voltage is below this value, comparator 300 keeps transistor 502 turned off, signaling to the charging system that the battery should be charged. On the other hand, when the battery voltage is above this voltage, comparator 300 turns transistor 502 on, to signal the charging system to stop charging the battery.

The desired reference voltage curve for the battery changes slope at 40° C., as shown in FIG. 3. An additional comparator 400, as shown in FIG. 5, is added to the circuit in order to track section 96 of the battery voltage curve shown in FIG. 3. Comparator 400 functions similarly to comparator 300.

Next, with reference to FIG. 6, the circuitry used to perform the function of comparator 400 will be described. Resistors 402, 404, and diode-connected transistor 406 of diode-connected comparator 400 correspond to the voltage divider formed by resistors 338, 336 and transistor 340 of comparator 300. In addition, transistors 408 and 410, resistor 412, 414, and 416 form a band-gap cell analogous to the band-gap cell in comparator 300 formed by transistors 302 and 304 and resistors 306, 308, and 310. Transistors 418 and 420 of comparator 400 correspond respectively to cascode transistors 318 and 316 in comparator 300. Finally, transistors 422, 424 and 426 in comparator 400 correspond respectively to transistors 320, 312 and 330 in comparator 500.

Transistors 436 and 438 form a differential amplifier. Transistor 442 is a controlled-beta transistor which controls the current supplied to the differential amplifier so as to make it proportional to the current in the band-gap cell of comparator 400. Transistor 442 is sized to supply twice the operating current of the band-gap cell to the differential amplifier. Consequently, one third of the current supplied by transistor 442 will flow into the band-gap cell, while the other two thirds of the current will flow into the differential amplifier formed by transistors 436 and 438.

One half of the current in the differential amplifier must be supplied to transistor 426 when transistor 426 begins to be turned on. Therefore, at the switching threshold, the base currents through transistors 436 and 438 are equal, thus eliminating base current errors and accurately maintaining the switching threshold.

Diode-connected transistor 440 clamps the voltage at the base of transistor 436 one base-emitter voltage below the balance point of the differential amplifier formed by transistors 436 and 438. The resulting output current from transistor 436 is conveyed to node 208 to supply drive current for output unit 500. Connecting transistor 436 to node 208 reduces the current which must be supplied by resistor 206.

The values of the components of comparator 400 are selected to make the band gap cell input voltage switching threshold correspond to a voltage at node 348 of 13.79 volts minus 11 millivolts per degree Celsius above 40° C. In order to control battery charging above 40° Celsius, comparator 400 functions to lower the voltage at the input 334 of comparator 300 by pulling current through resistor 428 whenever the voltage at node 348 falls below 13.79 volts minus 11 millivolts per degree Celsius. Decreasing voltage at node 334 causes comparator 300, which drives output transistor 502, to permit higher charging voltages. As a result, comparator 300 dominates and directly controls the output transistor 502 at temperatures below 40° C. Above 40° C., comparator 400 dominates and controls output transistor 502 indirectly by way of comparator 300.

Hysteresis for the switching points of comparator 400 is provided by resistor 432. Resistor 432 provides a small and well-controlled coupling of the signal from the collector of transistor 434 back to the input of comparator 400.

The circuit of FIG. 6 additionally can be adjusted, in order to make it track the smooth battery curve of FIG. 1 more accurately, by adding additional correction as disclosed in U.S. Pat. No. 4,250,445, also assigned to the same assignee as the present invention. The specification of U.S. Pat. No. 4,250,445 is incorporated herein by reference. The circuit can also be made to induce either positive or negative curvature, to allow it to more closely approximate any charging/gassing battery voltage characteristic.

The apparatus of FIG. 5 can be embodied in other forms and is not limited to the case illustrated in FIG. 6, where there are two comparators tracking two battery voltage characteristic curves. Additional comparators may be incorporated into the battery monitor apparatus to enable the battery monitor apparatus to track any battery voltage characteristic curve. Each comparator included in the battery monitor apparatus has a temperature coefficient whose slope respectively corresponds to the slope of a predetermined portion of the battery voltage characteristic curved. The comparators may be connected together either logically or using a connection as illustrated in FIG. 6.

Figure 8:
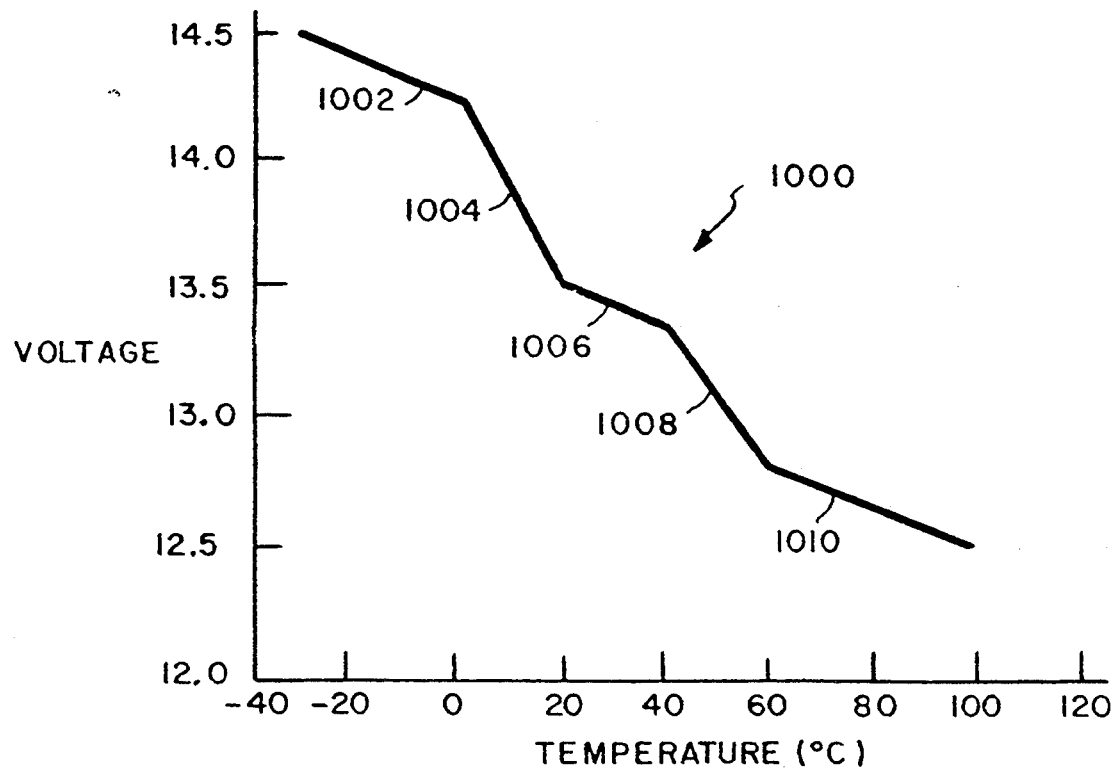
FIG. 8 is a graph having a plurality of piecewise linear portions depicting a desired relationship between battery temperature and battery voltage.
Figure 9:
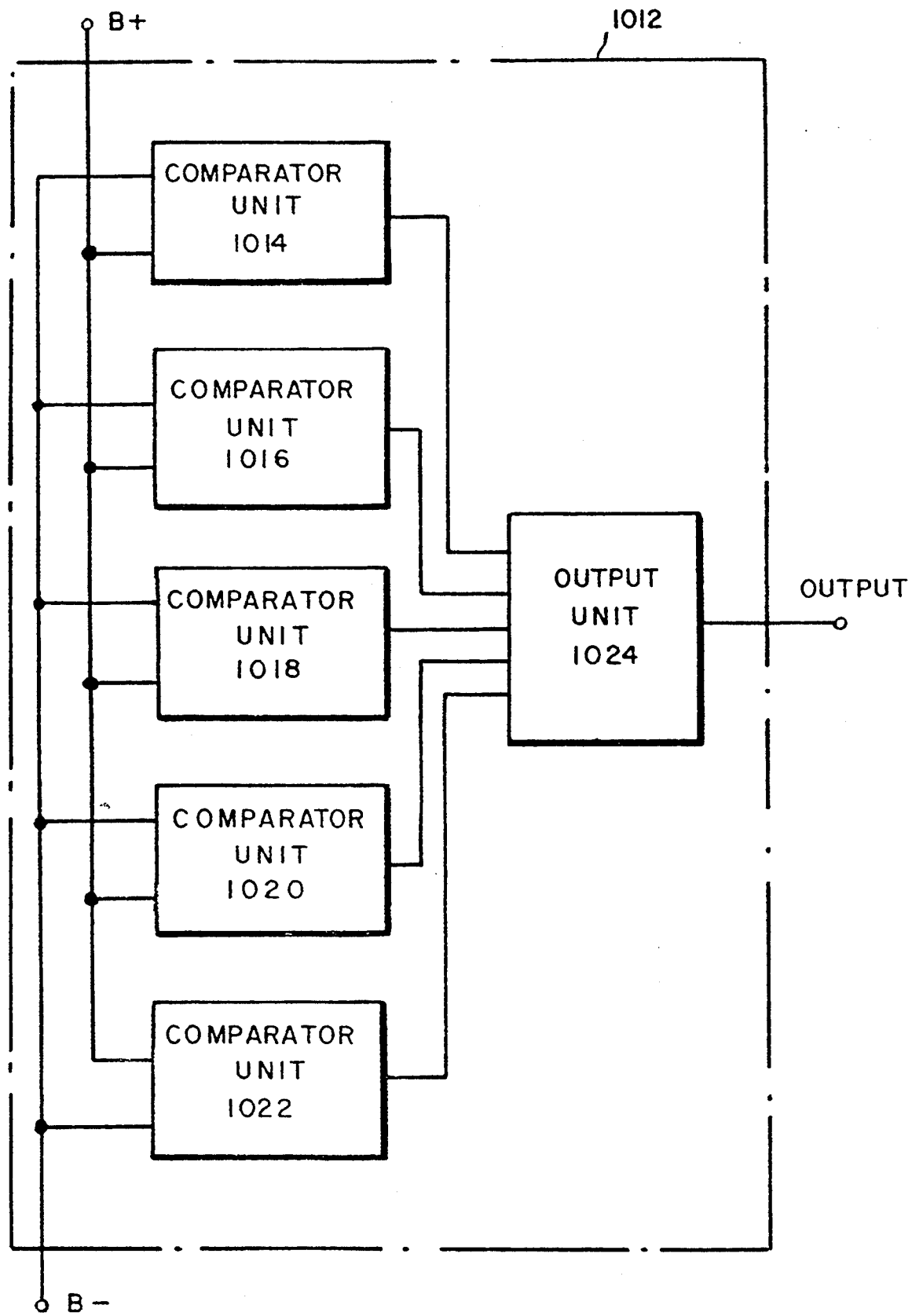
FIG. 9 is a schematic block diagram of an apparatus which may be used to track the storage battery temperature/voltage curve shown in FIG. 8.

For example, FIG. 8 shows a battery voltage reference curve 1000 which comprises 5 separate piecewise linear portions, 1002, 1004, 1006, 1008, and 1010. FIG. 9 shows a battery monitor apparatus 1012 of the present invention which may be used to track the voltage reference curved 1000. Comparator units 1014, 1016, 1018, 1020, and 1022 have temperature coefficients whose slopes respectively correspond to portions 1002, 1004, 1006, 1008, and 1010 of curve 1000. Output unit 1024 combines the outputs of comparators 1014, 1016, 1018, 1020, and 1022 in a logical fashion so that each comparator exclusively controls battery charging for the corresponding respective portion of the battery reference voltage curve 1000.

Figure 4:
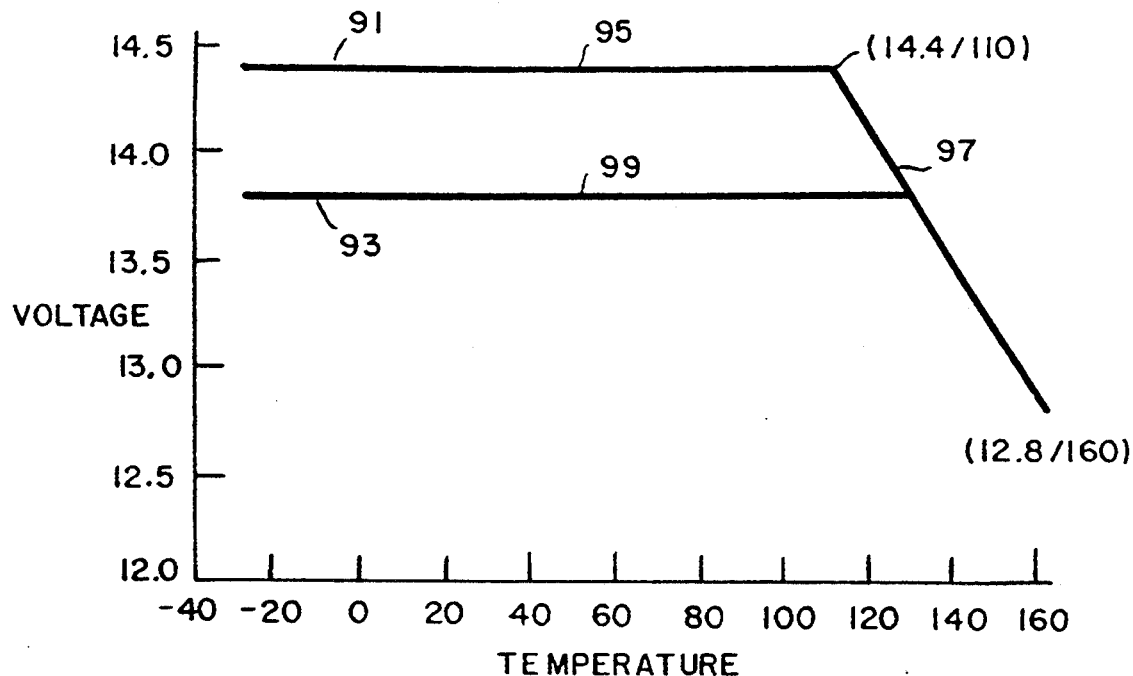
FIG. 4 is a graph depicting a desired relationship between the alternator temperature and maximum charging system voltage in the system of FIG. 2.

The battery monitor apparatus 20 signals another apparatus, the alternator control apparatus 70, to control charging of the battery. The alternator control apparatus is designed to follow a reference voltage curve. A typical automobile charging system reference voltage curve is shown in FIG. 4. Reference voltage curve 91 represents a desired charging system voltage curve when the vehicle headlamps are off. Reference voltage curve 93 represents a desired charging system voltage control curve when the vehicle headlamps are on. Reference voltage curve 91 has a charging limit of 14.4 volts, while reference voltage curve 93 has a charging limit of 13.8 volts. It is desirable to limit the charging voltage when the headlamps are on for both operational and reliability reasons. The headlamps should be operated near their maximum working voltage in order to maintain brightness, but to maintain longevity, they should not be operated above their maximum working voltage.

Figure 7:
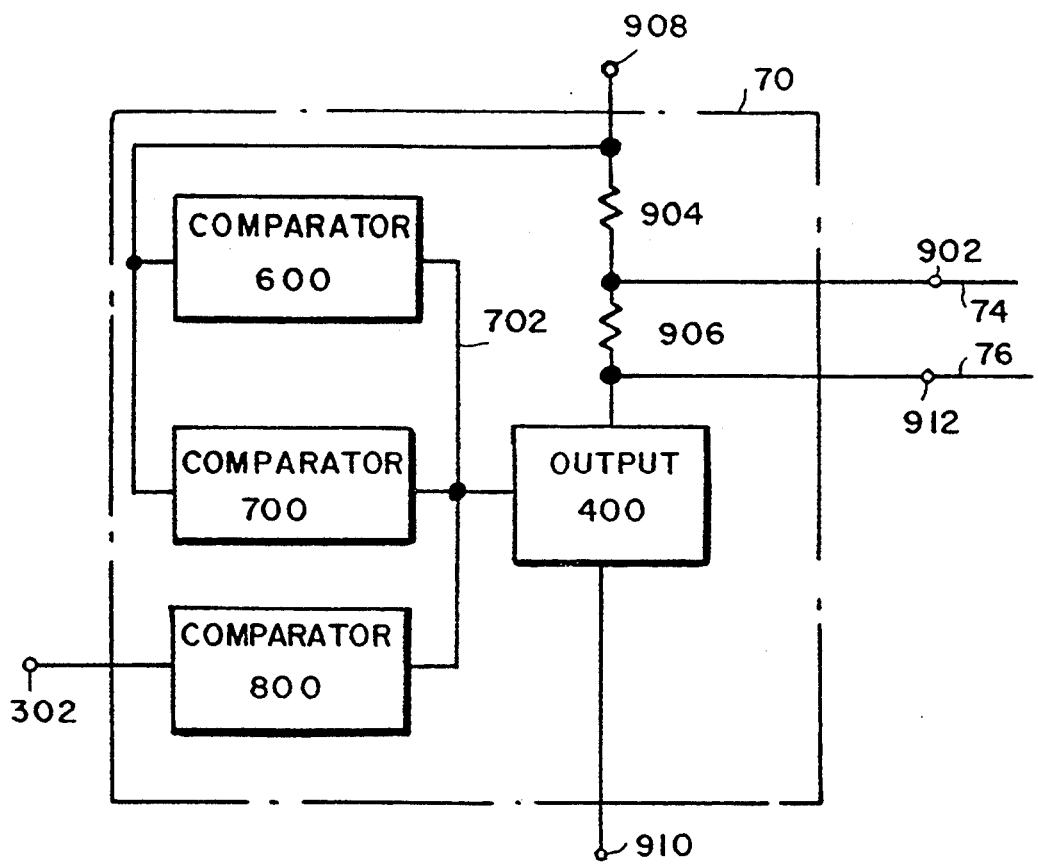
FIG. 7 is an illustrative schematic block diagram of an alternator control apparatus which may be used to track the alternator temperature/charging system voltage curve shown in FIG. 4.

In order to have the vehicle charging system track the desired charging voltage reference curves shown in FIG. 4, the apparatus shown in FIG. 7 may be used. The alternator control apparatus 70 includes three comparators, 600, 700, and 800. These comparators may be basically of the same construction as the comparators 300 and 400 included in the battery monitor apparatus, with modifications that will be discussed hereinafter.

Comparator 600 is used to provide a temperature-invariant charging system limiting voltage of 14.4 volts. This circuit can always turn on output section 900, which will switch off the excitation current to the alternator. Therefore, the 14.4 volt limit will override all other control circuits and prevent charging of the battery above this voltage. Comparator 600 compares the measured charging system voltage with an internal reference voltage that corresponds to section 95 of charging system reference voltage curve 91 shown in FIG. 4. The components of comparator 600 are selected to provide a temperature-invariant switching threshold.

Comparator 700 is similar to comparator 600 except that it has a temperature coefficient of 17.92 volts minus 32 millivolts per degree Celsius above 110° C. Comparator 700 compares the measured charging system voltage with an internal reference voltage that corresponds to section 97 of charging system reference voltage curves 91 and 93 as shown in FIG. 4. Consequently, as the temperature rises above 110° C, comparator 700 will operate output section 900 to control the alternator and reduce the charging system voltage in proportion to the increase in temperature.

Comparator 800 is similar to comparator 600 in that it is designed to provide a temperature-invariant switching threshold for output section 800. However, comparator 800 does not measure the power supply voltage from the battery. Instead, the input node 802 is connected to a low-beam headlamp (not shown) which acts as a remote voltage sensing point (see FIG. 2). Component values for comparator 800 are chosen to make 13.8 volts the temperature-invariant upper limit for charging when the low-beam headlamps are on. Thus, comparator 800 will track section 99 of charging system reference voltage curve 93 shown in FIG. 4. As discussed earlier, the charging system voltage should be limited when the headlamps are on, for reliability reasons. Comparator 800 guarantees that the battery will always be charged to the maximum state of charge without applying overvoltage to the headlamps.

The outputs of comparators 600, 700, and 800 are all wired together by connection 702 to output section 900. This yields what is essentially an "AND" function among all the comparators so that all three must agree to charge the battery or charging will be disabled. Therefore, the alternator control circuit will operate to track the charging system reference voltage curves shown in FIG. 4 in order to charge the battery to the desired voltage for a given temperature as shown in FIG. 3. As a consequence, the battery monitor apparatus and the alternator control apparatus act to maintain the battery in its highest state of charge for a given temperature, while accurately controlling the alternator charging voltage as a function of temperature and vehicle accessory loads.

The charge/don't charge signal line 74 from the battery monitor circuit (as shown in FIGS. 2, 5, 6 and 7) is connected to node 902 on the alternator control apparatus. Node 902 is connected, in turn, to a tap on the alternator control circuit output load comprising resistors 904 and 906. This connection protects the output section 900 (which may be a bipolar transistor, for example) from a momentary short circuit that may occur to nodes 908 or 910, which are connected to the battery positive and negative terminals as shown in FIG. 2. During operation, when the output of either the battery monitor apparatus or the alternator control apparatus is low, the voltage at node 912 controlled by output section 900 will be low. Consequently, power transistor 50 will be turned off via signal line 76, which will in turn shut off excitation current to the alternator, and the battery will not be charged. If, on the other hand, the output from both the battery monitor circuit and the alternator control circuit is high, the voltage at node 912 controlled by output section 900 will be high. Consequently, power transistor 50 will be turned on via signal line 76, and excitation current will be supplied to the alternator through the winding connection 42, and the battery will be charged.

The battery monitor apparatus and the alternator control apparatus may be individually manufactured using integrated circuit technology to enhance reliability and accuracy. One skilled in the art will also appreciate that the battery monitor apparatus and the alternator control apparatus may be manufactured as a single integrated circuit.

Having thus described one particular embodiment of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An apparatus for monitoring storage battery voltage as a function of storage battery temperature, comprising:
   means for sensing the storage battery voltage; and
   comparator means, including band-gap reference cell means, having at least two transistors operated at different current densities, for sensing the storage battery temperature and for providing a reference voltage threshold that varies with variations in the storage battery temperature by combining a voltage that changes in a manner proportional to changes in temperature with a voltage that changes in a manner complementary to changes in temperature, for comparing the storage battery voltage sensed by the means for sensing with the reference voltage threshold.

2. The apparatus of claim 1, wherein the reference voltage threshold varies as an equilibrium voltage threshold of the band-gap reference cell means.

3. The apparatus of claim 2, further comprising means for adjusting the equilibrium voltage threshold to track variations in a gassing voltage of the storage battery due to temperature changes.

4. The apparatus of claim 2, wherein the comparator means further comprises a plurality of comparators, each providing an associated reference voltage threshold, for respectively comparing the sensed storage battery voltage with the associated respective reference voltage threshold over a predetermined range of storage battery temperatures.

5. The apparatus of claim 4, wherein the plurality of comparators indicate differences between the sensed storage battery voltage and the respective reference voltage thresholds over mutually exclusive respective ranges of storage battery temperatures.

6. The apparatus of claim 3, further comprising:
   signalling means, respective to the comparator means, for providing a signal having a first state when the storage battery voltage sensed by the means for sensing is less than the reference voltage threshold and having a second state when the storage battery voltage sensed by the means for sensing is greater than the reference voltage threshold, wherein the first state indicates that the storage battery should be charged and the second state indicates that the storage battery should not be charged.

7. The apparatus of claim 6, further comprising:
   an additional comparator means, including band-gap reference cell means, having at least two transistors operated at differing current densities, for sensing the storage battery temperature and for providing a temperature invariant reference voltage threshold by combining a voltage that changes in a manner proportional to changes in temperature with a voltage that changes in a manner complementary to changes in temperature, for comparing the storage battery voltage sensed by the means for sensing with the temperature invariant reference voltage threshold.

8. The apparatus of claim 7, wherein the signalling means is additionally responsive to the additional comparator means, for providing the first state when the storage battery voltage sensed by the means for sensing is less than the temperature invariant reference voltage threshold and the second state when the storage battery voltage sensed by the means for sensing is greater than the temperature invariant reference voltage threshold.

9. The apparatus of claim 8, wherein the additional comparator comprises control means to override the comparator means to direct the signalling means to provide the second state of the signal when the storage battery temperature exceeds a predetermined value.

10. The apparatus of claim 9, wherein the output circuit means comprises a Darlington circuit.

11. The apparatus of claim 10, wherein the apparatus comprises a monolithic integrated circuit.

12. An apparatus for controlling a charging voltage provided to a storage battery by a charging device, comprising:
   means for sensing the charging voltage; and
   comparator means, including band-gap reference cell means, having at least two transistors operated at different current densities, for sensing charging device temperature and for providing a reference voltage threshold that varies with variations in the charging device temperature by combining a voltage that changes in a manner proportional to changes in temperature with a voltage that changes in a manner complementary to changes in temperature, for comparing the charging voltage provided by the charging device with the reference voltage threshold.

13. The apparatus of claim 12, wherein the reference voltage threshold varies as an equilibrium voltage threshold of the band-gap reference cell means.

14. The apparatus of claim 13, further comprising means for adjusting the equilibrium voltage threshold to track a characteristic of the charging device wherein the characteristic describes a desired voltage provided by the charging device as a function of the charging device temperature.

15. The apparatus of claim 12, wherein the comparator means comprises a plurality of comparators, each providing an associated reference voltage threshold for respectively comparing the charging voltage provided by the charging device with the associated respective reference voltage threshold over a respective predetermined range of charging device temperature.

16. The apparatus of claim 15, wherein the plurality of comparators indicate differences between the charging voltage provided by the charging device and the respective reference voltage thresholds over mutually exclusive respective ranges of charging device temperatures.

17. The apparatus of claim 14, further comprising:
signalling means, respective to the comparator means, for providing a signal having a first state when the charging voltage sensed by the means for sensing is less than the reference voltage threshold and having a second state when the storage battery voltage sensed by the means for sensing is greater than the reference voltage threshold, wherein the first state indicates that the charging device should provide charging voltage and the second state indicates that the charging device should not provide charging voltage.

18. The apparatus of claim 17, further comprising:
a first additional comparator means, including band-gap reference cell means, having at least two transistors operated at differing current densities, for sensing charging device temperature and for providing a first temperature invariant reference voltage threshold by combining a voltage that changes in a manner proportional to changes in temperature with a voltage that changes in a manner complementary to changes in temperature, for comparing the charging voltage sensed by the means for sensing with the temperature invariant reference voltage threshold.

19. The apparatus of claim 18, further comprising:
a second additional comparator means, including band-gap reference cell means, having at least two transistors operated at differing current densities, responsive to a signal indicating that at least one predetermined electrical accessory is on, for sensing charging device temperature and for providing a second temperature invariant reference voltage threshold by combining a voltage that changes in a manner proportional to changes in temperature with a voltage that changes in a manner complementary to changes in temperature, for comparing the charging voltage sensed by the means for sensing with the second temperature invariant reference voltage threshold.

20. The apparatus of claim 19, wherein the at least one predetermined electrical accessory comprises a headlamp in an automobile.

21. The apparatus of claim 20, wherein the headlamp is a low-beam headlamp.

22. The apparatus of claim 17, wherein the signalling means is additionally responsive to the first additional comparator means, for providing the first state when the charging voltage sensed by the means for sensing is less than the first temperature invariant reference voltage threshold and the second state when the charging voltage sensed by the means for sensing is greater than the first temperature invariant reference voltage threshold.

23. The apparatus of claim 22, wherein the signalling means is additionally responsive to the second additional comparator means, for providing the first state when the charging voltage sensed by the means for sensing is less than the second temperature invariant reference voltage threshold and the second state when the charging voltage sensed by the means for sensing is greater than the second temperature invariant reference voltage threshold.

24. The apparatus of claim 23, wherein the first temperature invariant reference voltage threshold is greater than the second temperature invariant voltage threshold.

25. The apparatus of claim 23, wherein the first additional comparator comprises first control means, to override the comparator means, for directing the signalling means to provide the second state of the signal when the charging device temperature exceeds a predetermined value.

26. The apparatus of claim 23, wherein the second additional comparator means comprises second control means, to override the first additional comparator, for directing the signalling means to provide the second state of the signal in response to the signal indicating that at least one predetermined electrical accessory is on.

27. The apparatus of claim 24, wherein the output circuit means comprises a Darlington circuit.

28. The apparatus of claim 25, wherein the apparatus comprises a monolithic integrated circuit.

29. A system for controlling a charging voltage provided to a storage battery by a charging device as a function of storage battery temperature, charging device temperature, and electrical load on the charging device and storage battery, comprising:
means for sensing the storage battery voltage;
first comparator means, including band-gap reference cell means, having at least two transistors operated at differing current densities, for sensing the storage battery temperature and for providing a first reference voltage threshold that varies with variations in the storage battery temperature by combining a voltage that changes in a manner proportional to changes in temperature with a voltage that changes in a manner complementary to changes in temperature, for comparing the storage battery voltage with the first reference voltage threshold;
first signalling means, responsive to the first comparator means, for providing a first signal having a first state when the storage battery voltage sensed by the means for sensing is less than the fist reference voltage threshold and having a second state when the storage battery voltage sensed by the means for sensing is greater than the first reference voltage threshold, wherein the first state indicates that the storage battery should be charged and the second state indicates that the storage battery should not be charged.
means for sensing the charging voltage;
second comparator means, including band-gap reference cell means, having at least two transistors operated at differing current densities, for sensing the charging device temperature and for providing a second reference voltage threshold that varies with variations in the charging device temperature by combining a voltage that changes in a manner proportional to changes in temperature with a voltage that changes in a manner complementary to changes in temperature, for comparing the charging voltage provided by the charging device with the second reference voltage threshold; and
second signalling means, responsive to the second comparator means, for providing a second signal to control the charging device, the second signal having a first state when the charging voltage sensed by the means for sensing is less than the second reference voltage threshold and having a second state when the charging voltage sensed by the means for sensing is greater than the second reference voltage threshold, the second signalling means being additionally responsive to the first signalling means so that charging of the storage battery occurs when the first signalling means provides the first signal having the first state and the second signalling means provides the second signal having the first state and charging of the storage battery is disabled when either the first signalling means provides the first signal having the second state or the second signalling means provides the second signal having the second state.

30. The system of claim 29, wherein the system comprises a monolithic integrated circuit.

31. The system of claim 29, wherein the means for sensing the storage battery voltage, the first comparator means, and the first signalling means comprise a monolithic integrated circuit.

32. The system of claim 29, wherein the means for sensing the charging voltage, the second comparator means, and the second signalling means comprise a monolithic integrated circuit.

33. An apparatus for monitoring storage battery voltage as a function of storage battery temperature, comprising:
   a sensor sensing the storage battery voltage; and
   a comparator, including band-gap reference cell, having at least two transistors operated at different current densities, the sensing storage battery temperature and providing a reference voltage threshold that varies with variations in the storage battery temperature by combining a voltage that changes in a manner proportional to changes in temperature with a voltage that changes in a manner complementary to changes in temperature, comparing the storage battery voltage sensed by the sensor with the reference voltage threshold.

34. An apparatus for controlling a charging voltage provided to a storage battery by a charging device, comprising:
   a sensor for sensing the charging voltage; and
   a comparator, including a band-gap reference cell, having at least two transistors operated at different current densities, the sensing charging device temperature and providing a reference voltage threshold that varies with variations in the charging device temperature by combining a voltage that changes in a manner proportional to changes in temperature with a voltage that changes in a manner complementary to changes in temperature, comparing the charging voltage provided by the charging device with the reference voltage threshold.

35. A system for controlling a charging voltage provided to a storage battery by a charging device as a function of storage battery temperature, charging device temperature, and electrical load on the charging device and storage battery, comprising:
   a sensor for sensing the storage battery voltage;
   a first comparator, including a band-gap reference cell, having at least two transistors operated at different current densities, for sensing the storage battery temperature and for providing a first reference voltage threshold that varies with variations in the storage battery temperature by combining a voltage that changes in a manner proportional to changes in temperature with a voltage that changes in a manner complementary to changes in temperature, comparing the storage battery voltage with the first reference voltage;
   a first signalling circuit, responsive to the first comparator, providing a first signal having a first state when the storage battery voltage sensed by the storage battery voltage sensor is less than the first reference voltage threshold and having a second state when the storage battery voltage sensed by the storage battery voltage sensor is greater than the first reference voltage threshold, wherein the first state indicates that the storage battery should be charged and the second state indicates that the storage battery should not be charged;
   a sensor sensing the charging voltage;
   a second comparator, including a band-gap reference cell, having at least two transistors operated at different current densities, sensing the charging device temperature and providing a second reference voltage threshold that varies with variations in the charging device temperature by combining a voltage that changes in a manner proportional to changes in temperature with a voltage that changes in a manner complementary to changes in temperature, comparing the charging voltage provided by the charging device with the second reference voltage threshold; and
   a second signalling circuit, responsive to the second comparator, providing a second signal to control the charging device, the second signal having a first state when the charging voltage sensed by the charging voltage sensor is less than the second reference voltage threshold and having a second state when the charging voltage sensed by the charging voltage sensor is greater than the second reference voltage threshold, the second signalling circuit being additionally responsive to the first signalling circuit so that charging of the storage battery occurs when the first signalling circuit provides the first signal having the first state and the second signalling circuit provides the second signal having the first state and charging of the storage battery is disabled when either the first signalling circuit provides the first signal having the second state or the second signalling circuit provides the second signal having the second state.

* * * * *